(12) United States Patent
Khalil

(10) Patent No.: US 8,381,186 B2
(45) Date of Patent: Feb. 19, 2013

(54) SOFTWARE TRAINING APPLICATION USING AUTOMATED DISCOVERY OF USER INTERFACE CONTROLS

(75) Inventor: Manah M. Khalil, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 315 days.

(21) Appl. No.: 12/817,567

(22) Filed: Jun. 17, 2010

(65) Prior Publication Data
US 2011/0314455 A1    Dec. 22, 2011

(51) Int. Cl.
G06F 9/44        (2006.01)
G06F 9/45        (2006.01)

(52) U.S. Cl. .................. 717/124; 717/135; 717/137

(58) Field of Classification Search .................. None
See application file for complete search history.

(56) References Cited

U.S. PATENT DOCUMENTS

| | | | | |
|---|---|---|---|---|
| 7,448,042 | B1* | 11/2008 | Engber et al. ................ | 719/313 |
| 7,730,446 | B2* | 6/2010 | Anonsen et al. ............. | 717/137 |
| 8,205,175 | B2* | 6/2012 | Waters et al. ................ | 717/137 |
| 2004/0029092 | A1* | 2/2004 | Orr et al. ..................... | 434/354 |
| 2007/0094192 | A1* | 4/2007 | Aurora et al. ................. | 706/46 |
| 2007/0261035 | A1* | 11/2007 | Duneau ........................ | 717/135 |
| 2008/0208365 | A1* | 8/2008 | Grgic et al. .................... | 717/135 |
| 2010/0023928 | A1* | 1/2010 | Hentschel et al. ............ | 717/124 |
| 2010/0125832 | A1* | 5/2010 | Prasad et al. .................. | 717/124 |
| 2010/0251209 | A1* | 9/2010 | Murthy ......................... | 717/104 |
| 2012/0047487 | A1* | 2/2012 | Ambichl et al. .............. | 717/124 |
| 2012/0047490 | A1* | 2/2012 | Ambichl et al. .............. | 717/124 |

OTHER PUBLICATIONS

Heinrich et al., "A Platform to Automatically Generate and Incorporate Documents into an Ontology-Based Content Repository", 2009 ACM, pp. 1-4; <http://dl.acm.org/citation.cfm?doid=1600193.1600204>.*

Arpan Sen, "Learning doxygen for source code documentation", Jul. 29, 2008, IBM, pp. 1-14; <http://download.boulder.ibm.com/ibmdl/pub/software/dw/aix/au-learningdoxygen/au-learningdoxygen-pdf.pdf>.*

Kanellopoulos et al., "Data Mining Source Code to Facilitate Program Comprehension", 2004 IEEE, pp. 1-10; <http://ieeexplore.ieee.org/stamp/stamp.jsp?tp=&arnumber=1311063>.*

* cited by examiner

*Primary Examiner* — Thuy Dao
*Assistant Examiner* — Ben C Wang

(57) ABSTRACT

Software applications ("training applications") that are designed to train users how to use a target software application may be generated by automatic examination of the target application. In one implementation, a device may extract elements of the target application that affect a user interface of the target application. The device may store the elements as user interface elements and generate a training application that uses at least some of the user interface elements to present portions of an interface of the target application.

22 Claims, 11 Drawing Sheets

SOFTWARE TRAINING APPLICATION USING AUTOMATED DISCOVERY OF USER INTERFACE CONTROLS

BACKGROUND

Software applications are a common part of the work and home environment. An employee, for instance, may use many different software applications in the course of a work day. Some of the software applications may be custom applications that were created by the employer to assist in the operation of the employer's business.

Some software applications can be relatively complex and may require training for a user to be able to effectively use the application. Producing training materials for an application can be costly. It is desirable if training materials for a software application can be efficiently created.

DETAILED DESCRIPTION

The following detailed description refers to the accompanying drawings. The same reference numbers in different drawings may identify the same or similar elements. Also, the following detailed description does not limit the invention.

Implementations described herein relate to a tool for creating software applications ("training applications") that are designed to train users how to use a target software application. The training applications may be generated, at least in part, by automatic examination of the target application, and potentially cloning its user interface (UI). In one implementation, the target application may be analyzed to automatically capture the user interface elements of the target application. The captured user interface elements may be used to generate an equivalent UI clone of the training application form.

Figure 1:
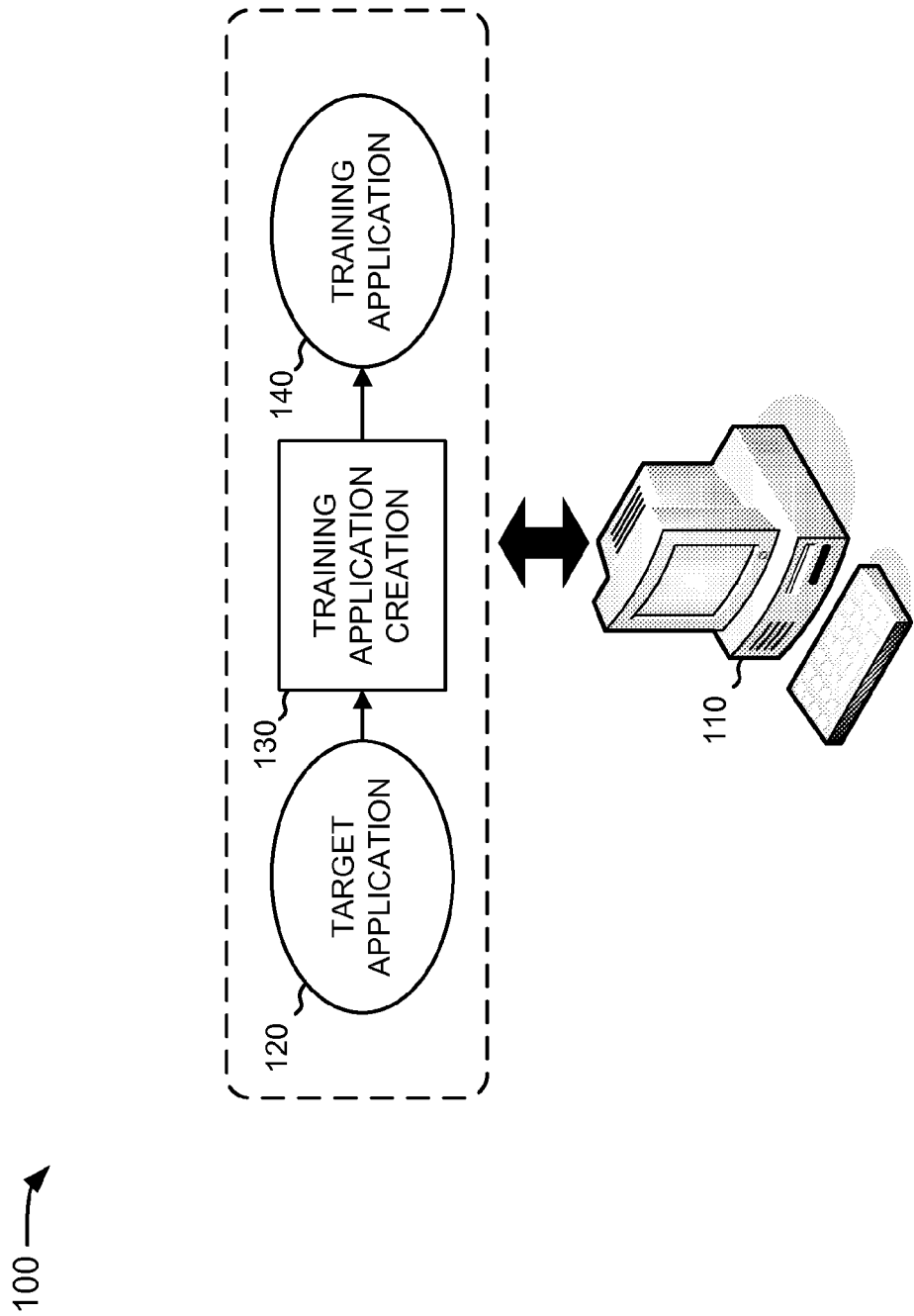
FIG. 1 is an exemplary diagram of a system in which concepts described herein may be implemented.

FIG. 1 is an exemplary diagram of a system 100 in which concepts described herein may be implemented. The system may include a personal computer or workstation 110. Workstation 110 may include, for example, a keyboard, a display or monitor, and a casing or housing. Workstation 110 may execute an application integrated development environment (IDE) through which users can create software applications.

Although workstation 110 is shown as a single detached computer, it can be appreciated that workstation 110 may be implemented by multiple networked computing devices. In such an implementation, the software applications executed by workstation 110 may be executed in a distributed manner, such as via execution on multiple computing devices simultaneously. Further, although workstation 110 is illustrated as a stand-alone personal computer, workstation 110 could be implemented as any form of computing device, such as a laptop computer, a smart phone, a personal digital assistant (PDA), or another type of portable computing device.

Workstation 110 may be used to create, based on a target application 120 and via a training application creation component 130, a training application 140. Target application 120 may include any software application for which it is desired to create training materials. The training materials may take the form of a separate application (e.g., training application 140). A user (trainee) that would like to learn how to use target application 120 may execute training application 140. Training application 140 may present a "dummy" user interface to the trainee, where the dummy user interface is, at least partially, automatically identified from target application 120. The trainee may interact with the dummy user interface similarly as if they were interacting with target application 120. However, instead of responding to trainee actions based on the actual underlying logic of target application 120, training application 140 may respond to the trainee actions based on training logic input or generated using training application creation component 130.

Training application creation component 130 may generate training application 140. Training application creation component 130 may generate training application 140 based on the captured UI for target application 120 and based on training rules or logic that are automatically and/or manually generated (i.e., by a developer) and that that may be implemented using a state machine.

As an example of an implementation of training application 140, consider the situation in which a company has developed an application to assist customer service representatives in responding to customer calls. The application may include a number of graphical user interface elements that display information relating to the customer that is calling and possible solutions to the problem the customer is experiencing. Training application 140 may mimic the user interface of the actual customer service application. The trainee may interact with training application 140 to become familiar with the customer service application and learn the features offered by the application. The data presented by training application 140, however, may be predetermined "dummy" training data.

Figure 2:
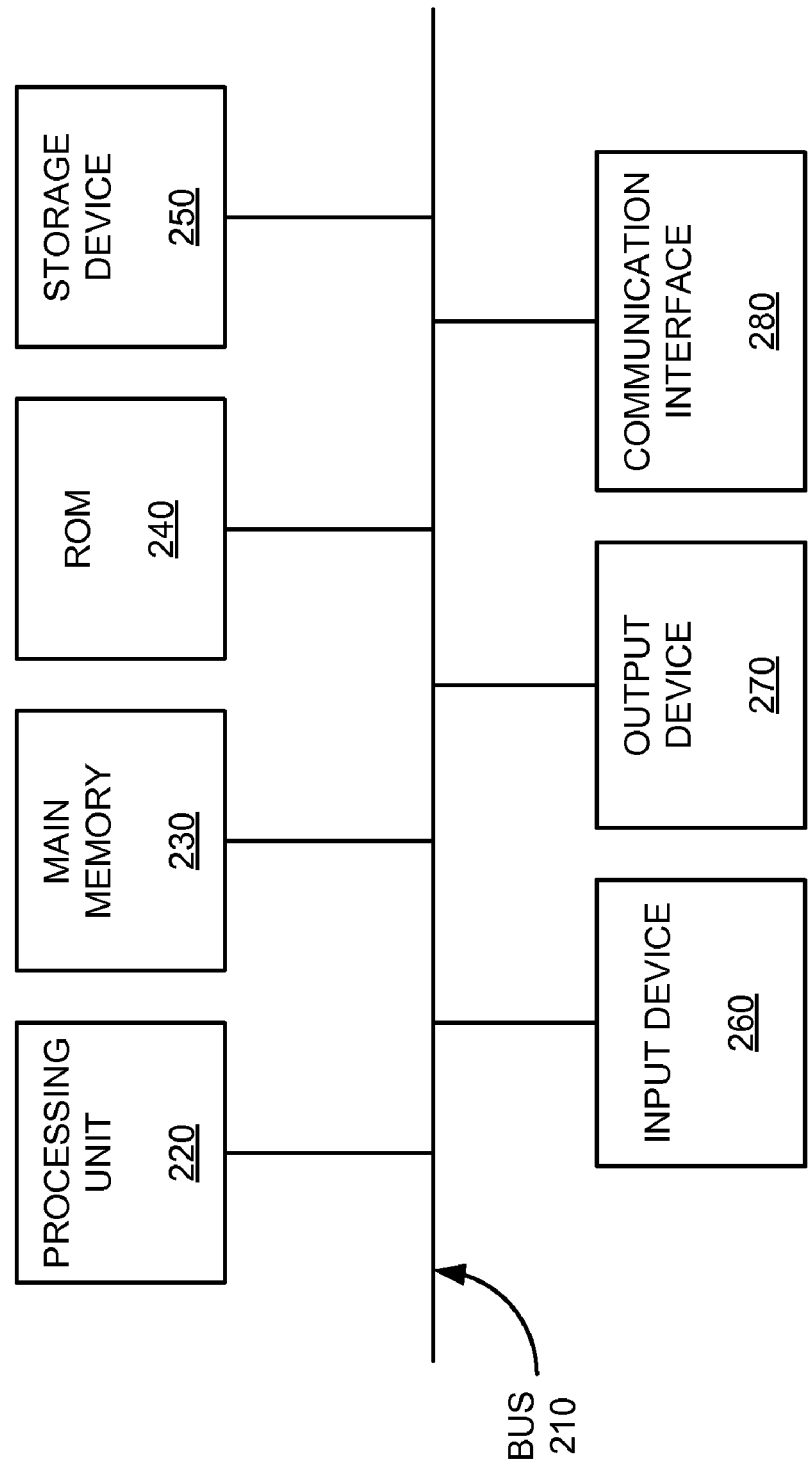
FIG. 2 is a diagram of an exemplary device corresponding to a workstation shown in FIG. 1.

FIG. 2 is a diagram of an exemplary device corresponding to workstation 110. As illustrated, workstation 110 may include a bus 210, a processing unit 220, a main memory 230, a read-only memory (ROM) 240, a storage device 250, an input device 260, an output device 270, and/or a communication interface 280. Bus 210 may include a path that permits communication among the components of workstation 110.

Processing unit 220 may include a processor, microprocessor, or other types of processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to workstation 110, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables workstation 110 to communicate with other devices and/or systems. For example, communication interface 280 may include mechanisms for communicating with another device or system via a network.

As will be described in detail below, workstation 110 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of workstation 110, in other implementations, workstation 110 may contain fewer, different, differently arranged, or additional components than depicted in FIG. 2. In still other implementations, one or more components of workstation 110 may perform one or more tasks performed by one or more other components of workstation 110.

Figure 3:
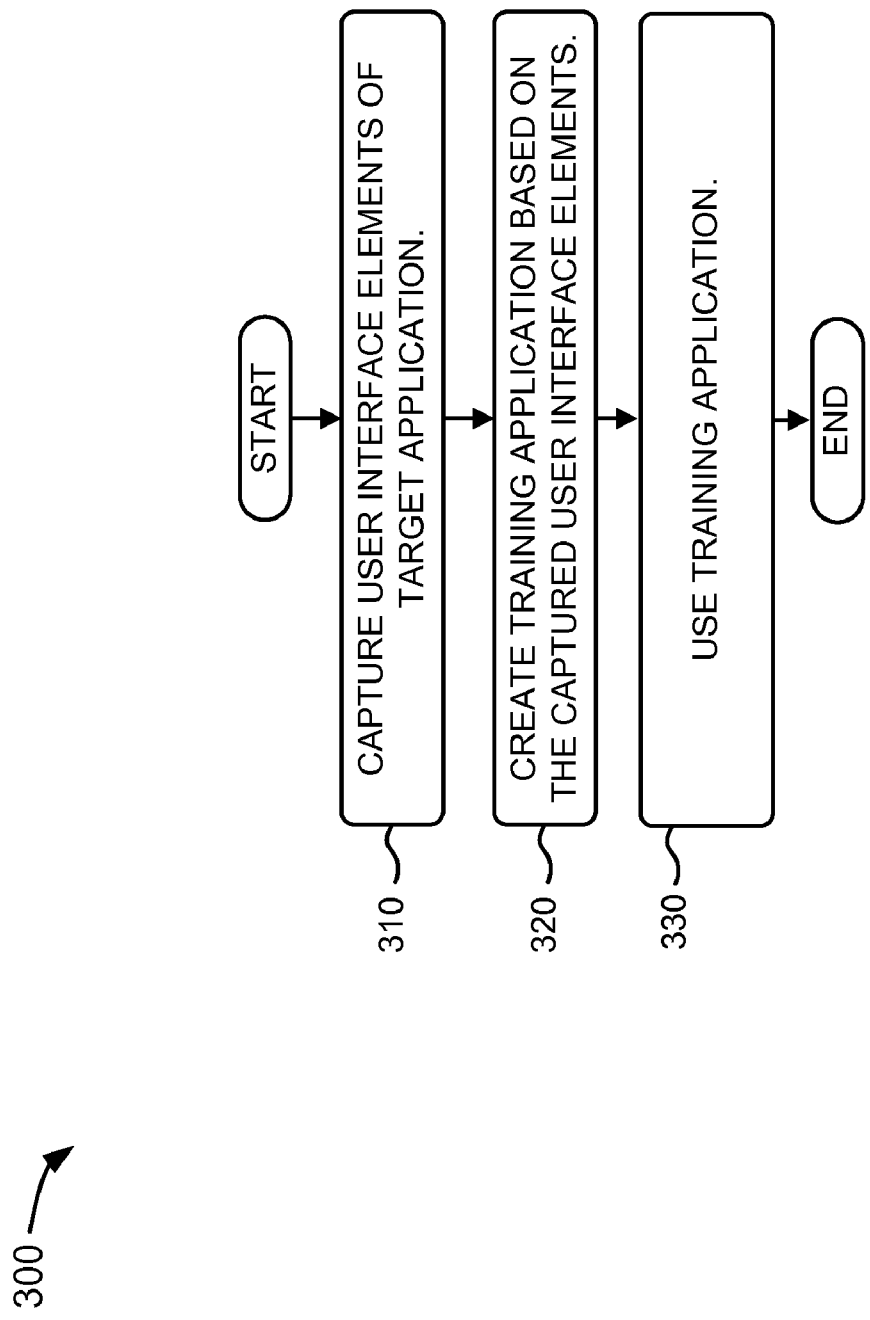
FIG. 3 is a flow chart illustrating an example process for creating a training application.

FIG. 3 is a flow chart illustrating an example process 300 for creating training application 140. Process 300 may be performed, for example, at workstation 110 by training application creation component 130 in either an entirely automated manner or with the assistance of a user.

Process 300 may include capturing user interface (UI) elements of target application 120 (block 310). Block 310 may generally include scanning the UI of target application 120 to extract the user interface elements. Extracting the user interface elements may include generating a log of user controls and the corresponding properties of the user controls. Block 310 is described in more detail below with reference to FIGS. 4-6.

Process 300 may further include creating training application 140 based on the captured UI elements (block 320). Creating training application 140 may generally include using the automatically extracted UI elements to efficiently present portions of the user interface of the target application in a way that facilitates training for target application 120. In one implementation, a state machine may be used to respond to events, such as user actions, to determine which of the user interface elements to present. Block 320 is described in more detail below with reference to FIGS. 7-9.

Process 300 may further include using the created training application 140 (block 330). Training application 140 may be, for example, an executable program. A user that would like training for target application 120 may execute and then interact with training application 140. An exemplary user interface that may be presented by an executing training application 140 is illustrated in more detail below with reference to FIGS. 11A and 11B.

Figure 4:
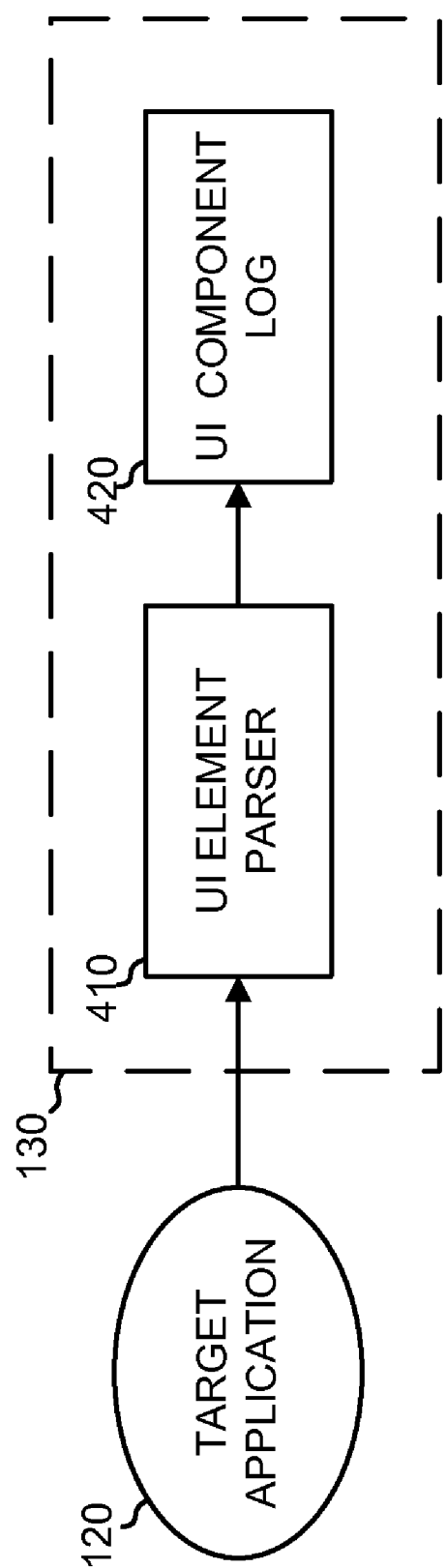
FIG. 4 is a diagram illustrating functional components in an example implementation of a training application creation component shown in FIG. 1.

FIG. 4 is a diagram illustrating functional components in an example implementation of training application creation component 130. Training application creation component 130 may include UI element parser 410 and an UI component log 420.

UI element parser 410 may operate on target application 120. In one implementation, UI element parser 410 may receive the source code of target application 120. UI element parser 410 may be designed to operate with one or more development environments and/or code types. For example, target application 120 may be a "Windows Forms" application constructed using the ".NET framework," available from Microsoft Corporation. UI element parser 410 may scan the source code of the input application for elements in the source code that relate to UI elements. In one implementation, the elements in the source code that relate to UI elements may be located by matching the elements in the source code to a list of known UI elements. For example, for a .NET Windows Forms application, a number of standardized UI elements are provided in the Integrated Development Environment (IDE) (i.e., the Microsoft VISUAL STUDIO environment) that is commonly used to create .NET Windows Forms applications. UI element parser 410 may scan the source code for these elements or for the presence of other known UI elements. UI element parser 410 may create a log of the UI elements, labeled as UI component log 420.

In alternative implementations, instead of receiving the source code of target application 120, UI element parser 410 may operate on other features or representations of target application 120. For example, in a Windows environment, UI element parser 410 may extract UI elements using the Microsoft ACTIVE ACCESSIBILITY (MSAA) interface of a Windows program.

UI component log 420 may be stored, for example, in main memory 230 or in storage device 250 of workstation 110. UI component log 420 may identify each UI element located by UI element parser 410 and may also include the properties associated with each element. The properties of an element may refer to the customizable parameters of an element that determine the specific visual appearance or other behavioral aspects of the UI element.

Although FIG. 4 shows exemplary functional components of training application creation component 130, in other implementations, training application creation component 130 may contain fewer, different, differently arranged, or additional functional components than depicted in FIG. 4. In still other implementations, one or more functional components of training application creation component 130 may perform one or more tasks performed by one or more other functional components of training application creation component 130.

Figure 5:
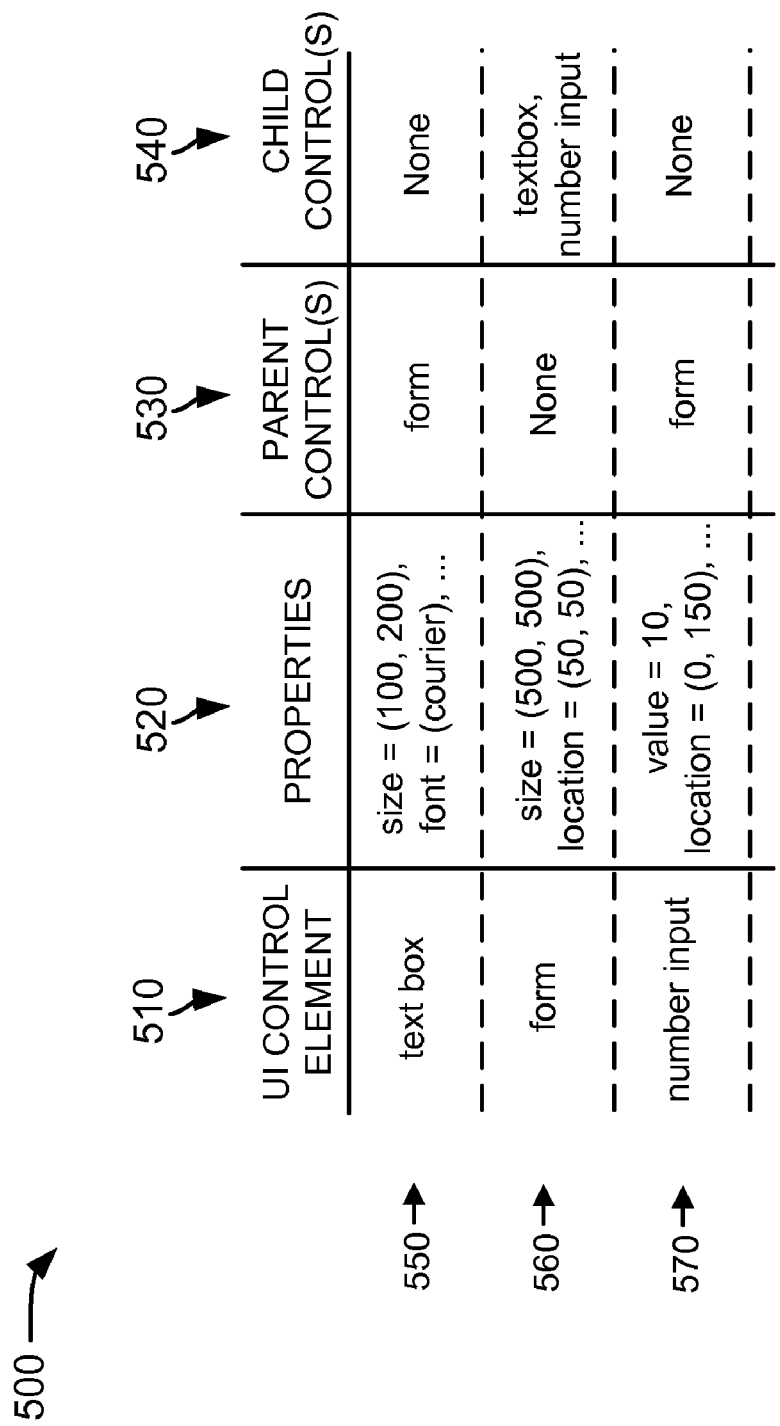
FIG. 5 is a diagram illustrating an example of a table that may implement a user interface component log shown in FIG. 4.

FIG. 5 is a diagram illustrating an example of a table 500 that implements UI component log 420.

Entries in table 500 may include a number of fields, such as a UI control element field 510, a properties field 520, a parent control(s) field 530, and a child control(s) field 540. UI control element field 510 may identify the UI element, such as by a class name, component name, unique identifier, or another identifier. A number of exemplary UI elements are illustrated in table 500, including a "text box" entry 550, a "form" entry 560, and a "number input" entry 570. Text box entry 550 may describe a UI element that presents an area on the screen into which a user can enter text. Form entry 560 may describe a UI element that includes a rectangular form (onto which other UI elements would typically be placed). Number input entry 570 may describe a UI element designed to input a numeric value. Properties field 520 may store properties relating to each entry. The properties may include any information relating to the display or behavior of the corresponding UI element. For example, text box entry 550 may include properties that include the size of the text box, the font used in the text box, and other information relating to the display of the text box. The properties stored in properties field 520 may correspond to the properties of the UI element that were extracted from target application 120.

UI elements may contain or be located in other UI elements. Parent(s) control field 530 may store the parent UI element for an entry in table 500 and child control(s) field 540 may store the child UI elements for the entry. In the example, form entry 560 does not include a parent control but includes two child controls: the text box corresponding to text box entry 550 and the number entry element corresponding to number input field 570. Similarly, text box entry 550 and number input entry 570 includes form entry 560 as a parent element. The text box and numeric entry elements may be displayed as part of the form corresponding to form entry 560.

In some implementations, table 500 can include other or fewer fields than those shown in FIG. 5.

Figure 6:
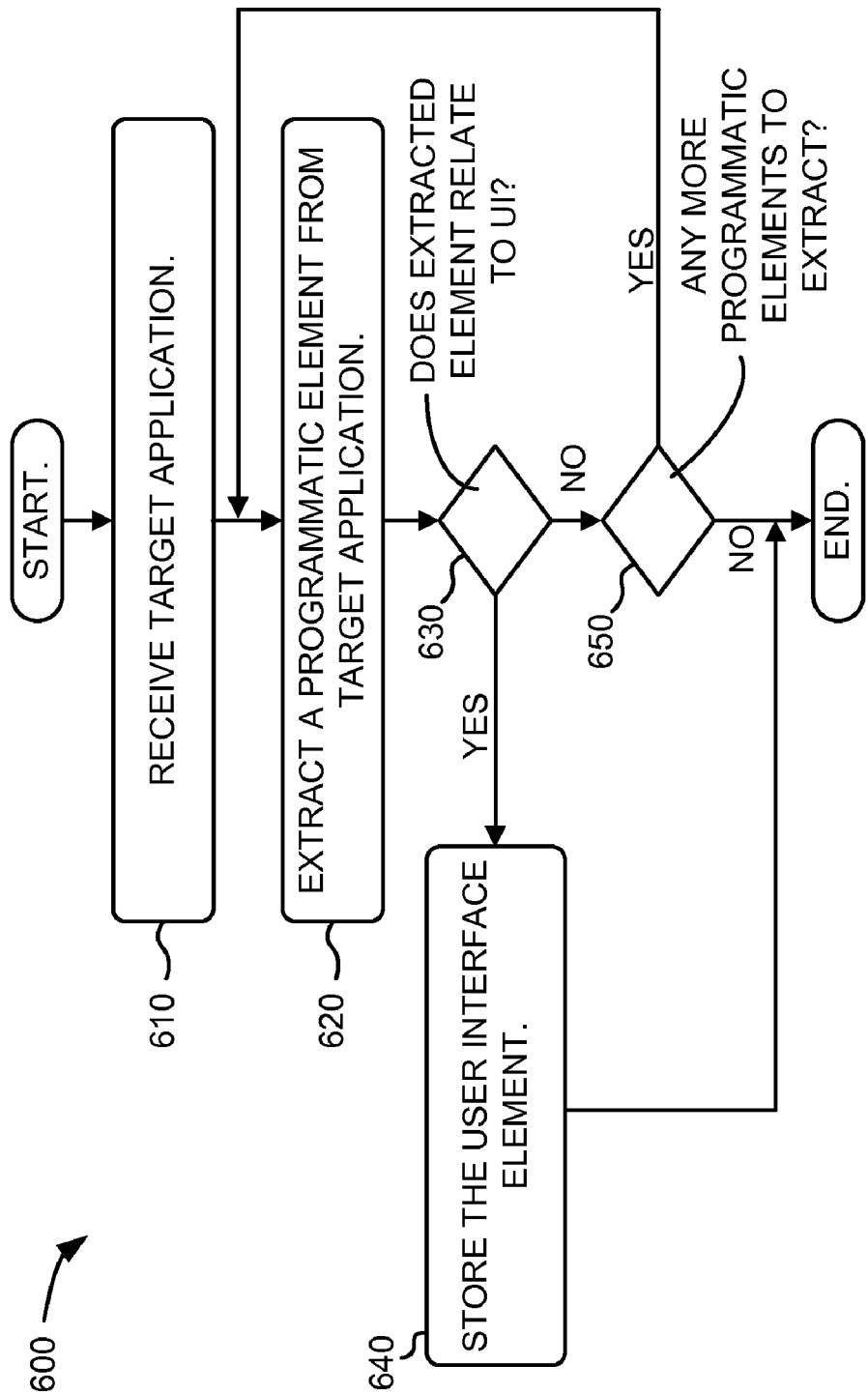
FIG. 6 is a flow chart illustrating an exemplary process for capturing user interface elements of a target application.

FIG. 6 is a flow chart illustrating an exemplary process 600 for capturing the UI elements of a target application. Process 600 may be performed, for example, by training application creation component 130.

Process 600 may include receiving the target application (block 610). Target application 120 may include any software application for which it is desired to create a "dummy" version of the UI elements of the application. The received version of target application 120 may be one in which it is possible to obtain a programmatic list of the UI elements, such as the source code of target application 120.

Process 600 may parse target application 120 to obtain the UI elements of target application 120. Parsing target application 120 is particularly illustrated in blocks 620-650.

Process 600 may include extracting a programmatic element from target application 120 (block 620). The particular programmatic elements that are extracted may depend on the development environment and/or programming language in which target application 120 is written. For example, the programmatic elements may include classes, structures, libraries, or other elements.

Process 600 may include determining whether the extracted programmatic element is one that relates to the UI seen by a user of the target application (i.e., whether the extracted programmatic element is a UI element) (block 630). Whether a programmatic element relates to the UI may be determined based on whether the programmatic element is recognized as a programmatic element that is known to perform UI-related actions. For example, certain development environments may include a set of standard programmatic elements that are intended to be used when creating a graphical UI. UI element parser 410 may compare the extracted programmatic element to this set of standard programmatic elements to determine whether the extracted programmatic element is one that relates to the UI. In some implementations, in addition to the standard programmatic elements that relate to the UI, other programmatic elements, such as custom programmatic elements that relate to the UI, may also be compared.

When the programmatic element is determined to relate to the UI, (block 630-YES), UI element parser 410 may store the UI element in UI component log 420 (block 640). As previously mentioned, UI component log 420 may also include properties associated with each programmatic element, such that each entry in UI component log 420 can be used to reproduce the graphical interface presented by the programmatic element.

When the programmatic element is determined to not relate to the UI (block 630-NO), blocks 620, 630, and 640 may be repeated until there are no more programmatic elements (block 650). In this manner, UI element parser 410 may automatically parse target application 120 to generate a set of programmatic elements that define the user interface for target application 120. This set of programmatic elements may represent a "dummy" version of the original target application 120, as it includes the interface presented by target application 120 but not the underlying logic.

Figure 7:
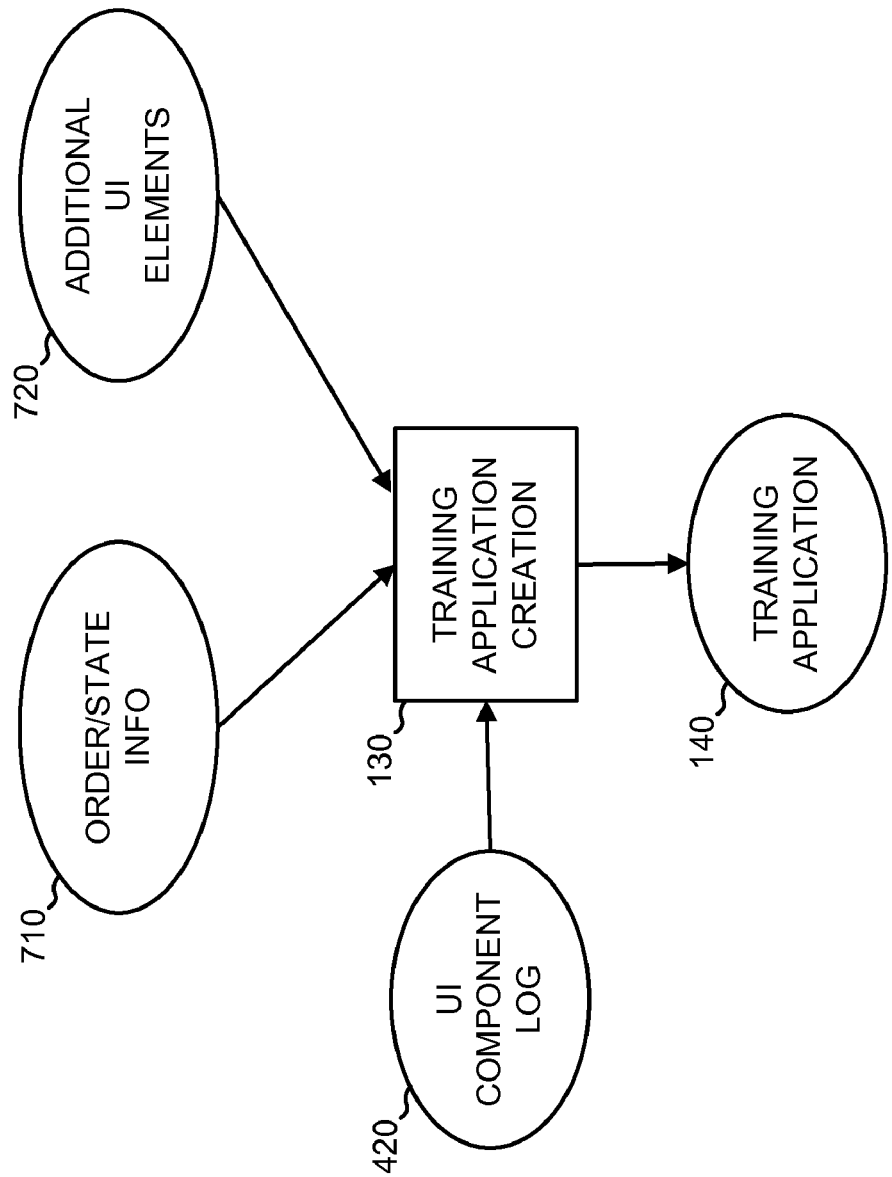
FIG. 7 is a diagram illustrating an example of types of information that may be used by a training application creation component when generating a training application.

FIG. 7 is a diagram illustrating an example of types of information that may be used by training application creation component 130 when generating training application 140. As shown, UI component log 420, order/state information 710, and additional UI elements 720 may be input to training application creation component 130 to generate training application 140.

Order/state information 710 may include information relating to the display order and/or the state of the graphical elements presented by training application 140. Order/state information 710 may include, for instance, a definition of the order in which UI elements in UI component log 420 are to be presented to the user. The order may be a fixed sequential ordering, an ordering based on reactions to user input, or an ordering based on other parameters. For example, in response to the user selecting a certain graphical button, order/state information 710 may cause a graphical text box to be displayed. The reactions to user input may be obtained from events that are associated with the user interface elements.

Order/state information 710 may additionally define properties for the UI elements. The properties of a UI element may include information (e.g., text) presented by the UI element, a color of the UI element, a location or a size of the UI element, and other display-related properties of the UI element. A single UI element may be displayed using different properties based on the state of training application 140 when the UI element is displayed. In one particular implementation, order/state information 710 may be used to define a state machine in which training application 140 is defined to include a number of possible discrete states. Each state may correspond to a particular user interface of training application 140. The state machine may store the transitions between the states.

Order/state information 710 may be generated manually by a designer, automatically, or semi-automatically. For example, the designer may choose which of the graphical elements in UI component log 410 to display at any particular state. The designer may also modify the properties of the graphical elements for any particular state. In general, when designing a training application, the designer may choose the order or presentation of the user interface elements so that the user of training application 140 learns how to use target application 120.

Additional UI elements 720 may include UI elements that were not extracted from target application 120. Additional UI elements 720 may include UI elements created by a designer of training application 140. For example, additional UI elements 720 may include UI elements that the designer would like to add to the UI elements of target application 120 to provide additional training information to the trainee.

FIG. 7 shows exemplary types of information that may be used by training application creation component 130. In other implementations, training application creation component 130 may use fewer, different, or additional types of information than that discussed with reference to FIG. 7.

Figure 8:
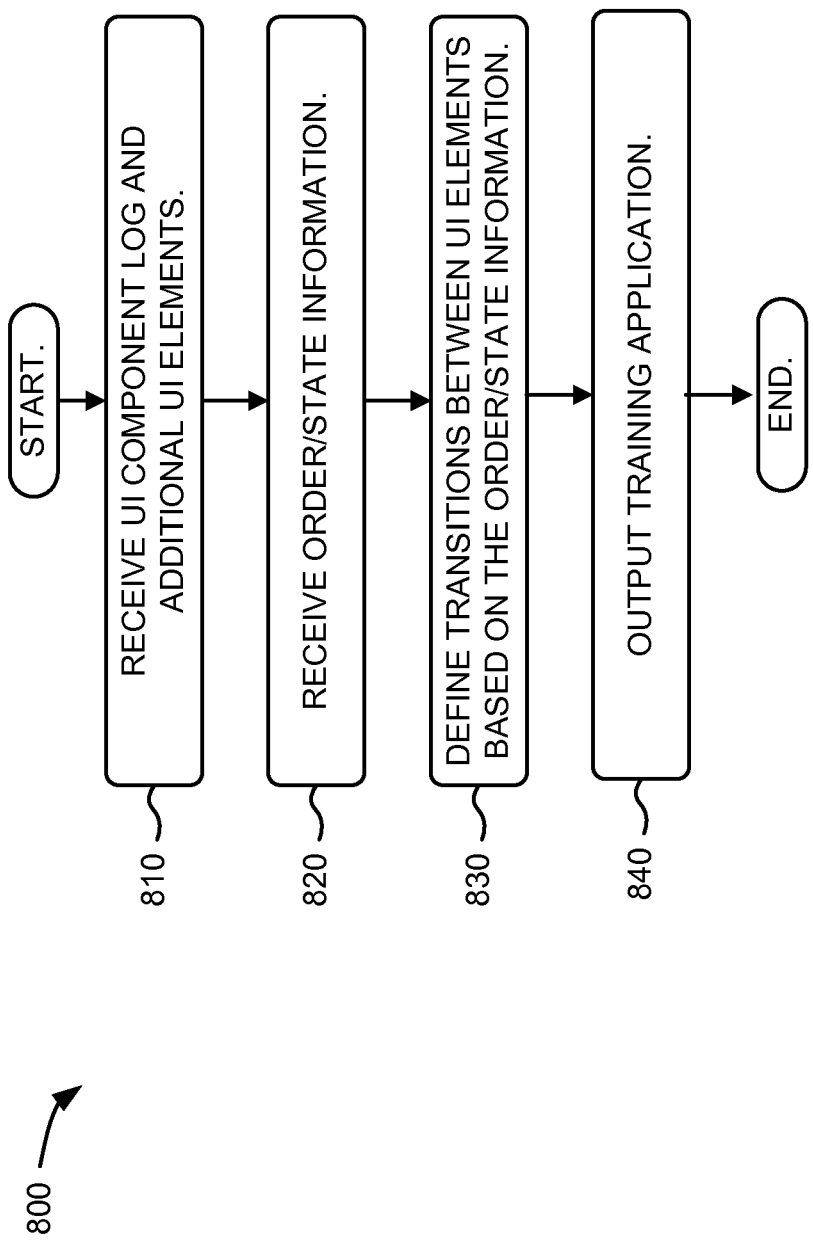
FIG. 8 is a flow chart illustrating an exemplary process for creating a training application.

FIG. 8 is a flow chart illustrating an exemplary process 800 for creating training application 140. Process 800 may be performed, for example, by training application component 130.

Process 800 may include receiving UI component log 420 and additional UI elements 720 (block 810). UI component log 420 and additional UI elements 720 may define a set of "building blocks" from which a user interface of training application 140 may be generated.

Process 800 may further include receiving order/state information 710 (block 820). In some implementations, order/state information 710 may be generated by training application component 130, such as through a developer's interaction with training application component 130.

Process 800 may further include defining transitions between the UI elements (such as the UI elements in UI component log 420 and additional UI elements 720) based on order/state information 710 (block 830). The transitions between the UI elements may also include a specification of the properties of each UI element at any particular state. In one implementation, a state machine may be generated to encapsulate the state transitions. A state machine may be particularly useful as a state machine can be used to validate the consistency of a user interface across multiple user interface elements, and the data associated with the UI elements. This type of validation, called cross-field validation, can be implemented by the state machine.

Figure 9:
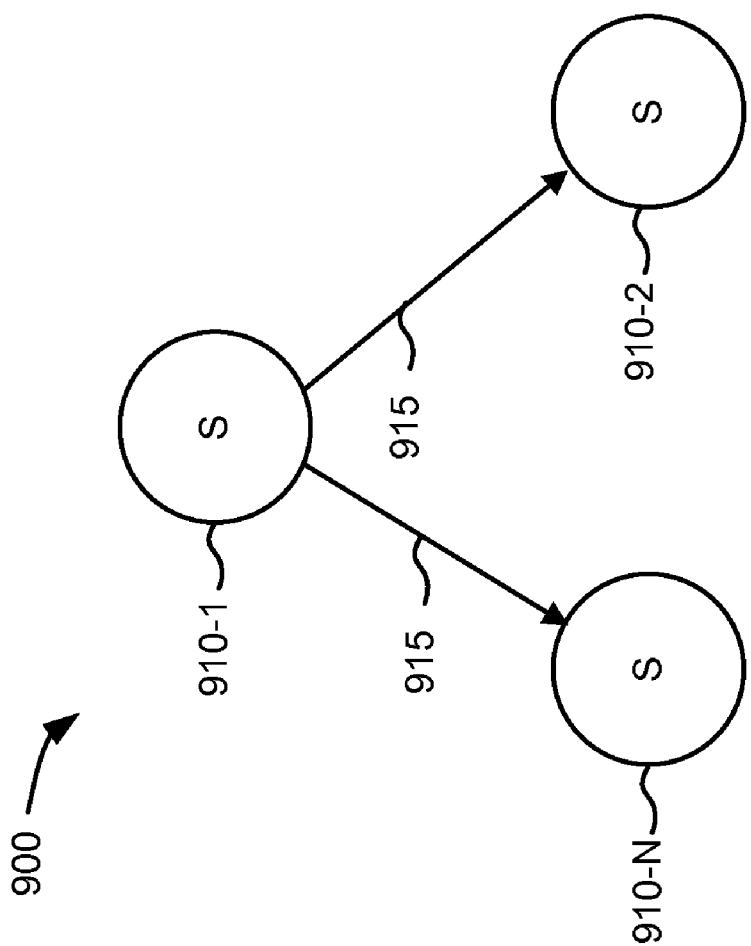
FIG. 9 is a diagram illustrating an exemplary state machine that may be used to implement the training application component.

FIG. 9 is a diagram illustrating an exemplary state machine 900 that may be used to define the transitions between the UI elements. State machine 900 may include a number of states 910-1 though 910-N, each of which may represent a state defined by a particular combination of active UI elements and the properties associated with those elements. Transitions between states, represented by lines 915, may represent events received from a user interacting with training application 140, such as mouse clicks, user typing, etc. A current state of state machine 900 may be based on the past states of the state machine.

As one example of the operation of state machine 900, assume state 910-1 includes the display of a user interface element that presents a message to the user and requests that the user respond by selecting "yes" or "no". State 910-1 may include a reference to a "message box" and the properties of the message box, such as the size of the message box and the text that is to be displayed. If the user selects the "yes" button for the message box, state machine 900 may transition to state 910-2. If the user selects the "no" button for the message box, state machine 900 may transition to state 910-N. The new state (i.e., state 910-1 or 910-N) may correspond to a different user interface presented by training application 140.

Referring back to FIG. 8, training application creation component 130 may output training application 140 (block 840). Outputting training application 140 may include, for example, outputting a compiled program that when run, presents a graphical UI designed to train a user to use target application 120. The compiled program may implement state machine 900.

Figure 10:
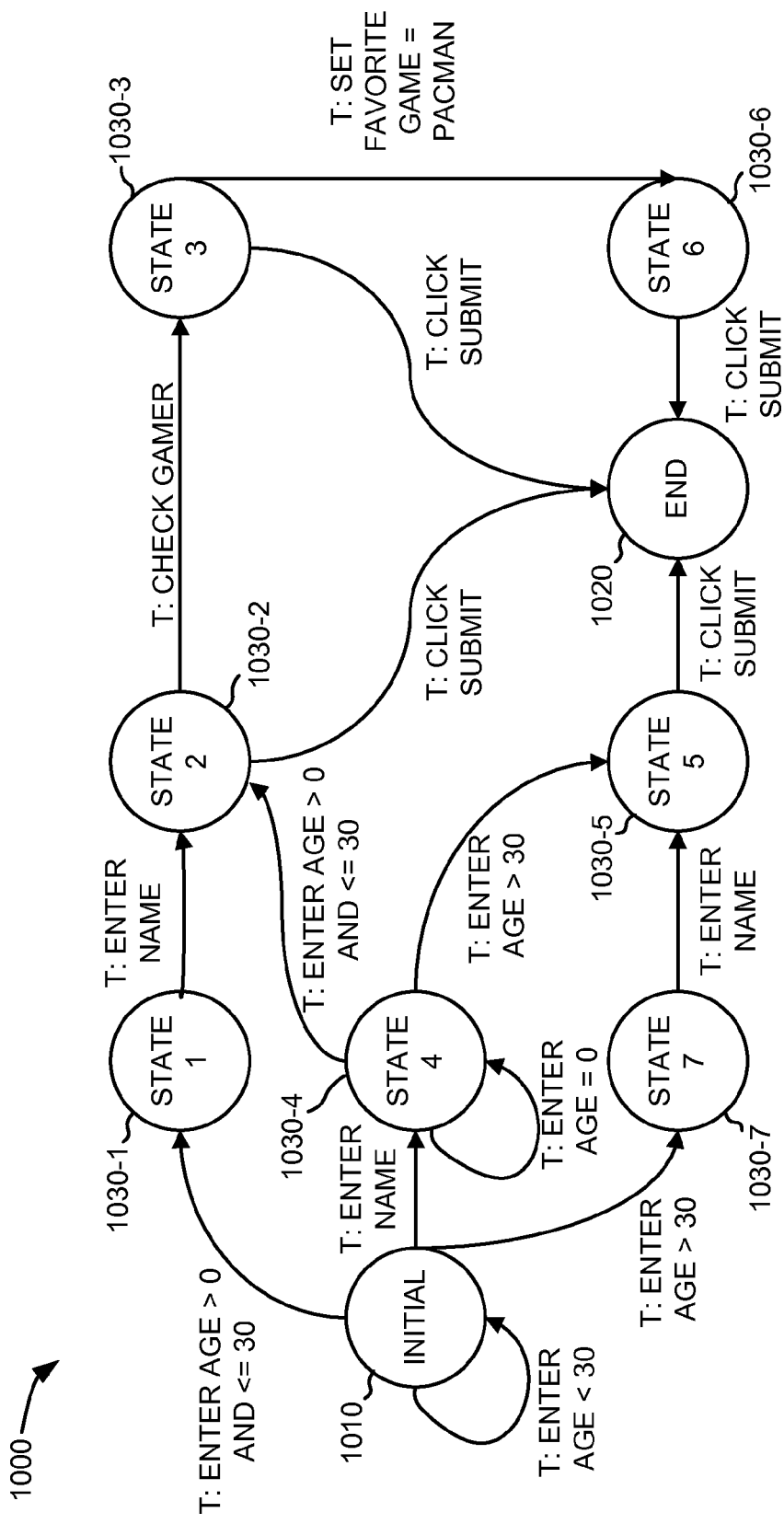
FIG. 10 is a diagram illustrating a second exemplary state machine that may be used to implement the training application component.

FIG. 10 is a diagram illustrating another example of a state machine, state machine 1000, that may be used to define the transitions between the UI elements. FIG. 10 particularly illustrates the use of state machine 1000 to perform cross-field validation for a form. The form represented by state machine 1000 may be a simple form that implements a survey relating to whether users play video games.

State machine 1000, as shown, includes nine states: initial state 1010 ("INITIAL"), end state 1020 ("END"), and seven intermediate states 1030-1 through 1030-7 (labeled state 1 through state 7). Assume that state machine 1000 represents a form with a number of UI elements, including a textbox called "NAME" for entering a user's name, a textbox called "AGE" for entering a user age, a checkbox called "GAMER" through which the user checks whether the user is a "gamer", a listbox called "FAVORITES" through which the user can select his/her favorite games, and a submit box called "SUBMIT".

Valid properties of each UI element are shown, for each state, in Table I, below. The set of properties corresponding to the UI elements of the form may represent a set of values for the form. Changes in the set of values may be valid or invalid depending on the state of state machine 1000. Starting from state 1010 (state: initial), for instance, the UI elements may include properties that represent a set of initial values. For example textbox NAME may include the value "empty" (i.e., no entered name), textbox AGE may include the value zero (i.e., age is zero), checkbox GAMER may include the value "unchecked" and the state "hidden" (i.e., the checkbox is not shown to the user), etc.

TABLE I

State: Initial
    Name, {value=empty}
    Age, {value=0}
    Gamer, {value=unchecked. state=hidden}
    Favorite Game, {value=Halo. state=hidden}
    Submit, {state=disabled}
State: State1
    Name, {value=empty}
    Age, {value>0 && value<=30}
    Gamer, {value=unchecked. state=visible}
    Favorite Game, {value=Halo. state=hidden}
    Submit, {state=disabled}
State: State2
    Name, {value=NOT empty}
    Age, {value>0 && value<=30}
    Gamer, {value=unchecked. state=visible}
    Favorite Game, {value=Halo. state=hidden}
    Submit, {state=enabled}
State: State3
    Name, {value=NOT empty}
    Age, {value>0 && value<=30}
    Gamer, {value=checked. state=visible}
    Favorite Game, {value=Halo. state=visible}
    Submit, {state=enabled}
State: State4
    Name, {value=NOT empty}
    Age, {value=0}
    Gamer, {value=unchecked. state=hidden}
    Favorite Game, {value=Halo. state=hidden}
    Submit, {state=enabled}
State: State5
    Name, {value=NOT empty}
    Age, {value>30}
    Gamer, {value=unchecked. state=hidden}
    Favorite Game, {value=Halo. state=hidden}
    Submit, {state=enabled}
State: State6
    Name, {value=NOT empty}
    Age, {value>0 && value<=30}
    Gamer, {value=checked. state=visible}
    Favorite Game, {value=Pacman. state=visible}

TABLE I-continued

```
Submit, {state=enabled}
State: State7
    Name, {value=empty}
    Age, {value>30}
    Gamer, {value=unchecked. state=hidden}
    Favorite Game, {value=Halo. state=hidden}
    Submit, {state=disabled}
State: End
    Name, {value=empty}
    Age, {value=0}
    Gamer, {value=unchecked. state=hidden}
    Favorite Game, {value=Halo. state=hidden}
    Submit, {state=disabled}
```

Transitions between the various states are shown in FIG. 10. From state 1010 to state 1030-1 (state 1), for example, a transition may occur when a user enters a value in the AGE textbox between zero and 30. In state 1, the GAMER checkbox may be modified to be changed from hidden to visible. Similarly, a transition may occur from initial state 1010 to state 1030-7 (state 7) when a user enters a value greater than 30 in the AGE textbox. Similar transition operations are illustrated in state machine 1000 for the other states. When state machine 1000 transitions to a new state, the properties of each of the UI elements may be updated to be consistent with the state, such as the UI property states shown in Table I. If a user changes a parameter to an invalid value based on the current state, the state of state machine 1000 may revert back to the last known "good" state. In this manner, state machine 1000 may provide cross-field validation for the UI elements of a form.

Additionally, as shown in FIG. 10, transitions between states may also be associated with a direction. For example, the transition from state 1 1030-1 to state 2 1030-2 may occur when the user enters his/her name in the NAME textbox. From state 2 1030-2, state machine 1000 may transition to state 3 1030-3 or to the end state 1020. However, there may be no valid transition from state 2 1030-2 back to state 1 1030-1. In other words, user action or transition leading to an overall state change of the UI may only be permissible when there is an outbound transition from the current state; inbound transitions from other states may not be evaluated when performing cross-field validation, thus preventing state machine 1000 from entering an invalid state.

Figures 11A, 11B:
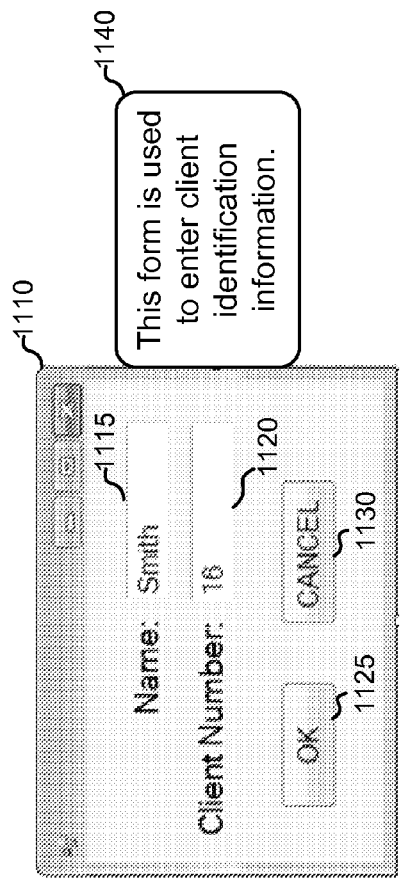
FIG. 11A is a diagram illustrating an exemplary user interface.
FIG. 11B is a diagram illustrating another exemplary user interface.

FIGS. 11A and 11B are diagrams illustrating exemplary user interfaces that may be presented by an implementation of training application 140. In this example, assume that target application 120 is a program through which users, among other things, enter information identifying a client. Training application 140 may present a series of user interfaces derived from the UI elements of target application 120.

FIG. 11A is a diagram illustrating an exemplary user interface 1100 that defines a form 1110 through which a user may enter client information. Form 1110 may include a text entry box 1115 for entering a client's name and a text entry box 1120 for entering a number corresponding to the client. Form 1110 may additionally include an "OK" button 1125 and a "CANCEL" button 1130. Form 1110 may have been obtained from target application 120 by training application creation component 130 and stored in UI component log 420.

User interface 1100, as displayed by training application 140, may include an additional graphical element 1140. Graphical element 1140 may display a "text bubble" that provides explanatory information relating to form 1110. Graphical element 1140 may be included as part of additional UI elements 720. For instance, a designer of training application 140 may create graphical element 1140 so that the user of training application 140 is presented with an explanation of the purpose of form 1110. The designer may also set order/state information 710 to include a state in which form 1110 is displayed next to graphical element 1140. Additionally, in this example, the designer has set the properties associated with text entry box 1115 to show the text "Smith" and the properties associated with text entry box 1120 to show the text "16." Accordingly, a state machine, such as state machine 900, that is implementing this training application, may include a state that corresponds to interface 1100.

At some point, the user of training application 140 may select OK button 1125. Assume that this event triggers state machine 900 to transition to a new state, which displays an exemplary interface 1150 (FIG. 10B). Interface 1150 may include a message box 1160 that displays a message to the user. Message box 1160 may have been obtained from target application 120 by training application creation component 130 and stored in UI component log 420.

User interface 1150, as displayed by training application 140, may include an additional graphical element 1170. Graphical element 1170 may display a "text bubble" that provides explanatory information relating to message box 1160. Graphical element 1170 may be included as part of additional UI elements 720.

As shown in FIGS. 11A and 11B, user interfaces that were automatically extracted from a target application can be used to efficiently generate a training application.

While series of blocks have been described with regard to FIGS. 3, 6, and 8, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method comprising:
   receiving, by the computing device, a target application for which a training application is to be generated;
   extracting, by the computing device, programmatic elements and associated properties of the target application;

identifying, by the computing device, ones of the extracted
elements that affect a first user interface of the target
application;
receiving, by the computing device, programmatic elements not extracted from the target application, and associated training parameters;
storing, by the computing device, the identified elements and the received elements as user interface elements;
generating, based on the associated training parameters, a set of training rules corresponding to the user interface elements, wherein the training rules differ from the associated properties; and
generating, by the computing device, the training application using at least some of the user interface elements, via which the training rules are configured to present portions of a second user interface corresponding to the target application responsive to input received from a user interacting with the training application, wherein the first and second user interfaces differ.

2. The method of claim 1, wherein extracting the programmatic elements and the associated properties of the target application further includes:
comparing each of the programmatic elements of the target application to:
a list of standard programmatic elements that relate to the user interface elements, and
a list of custom programmatic elements that relate to the user interface elements.

3. The method of claim 1, where the user interface elements include programmatic classes, structures, or libraries in a software development environment.

4. The method of claim 1, wherein the received elements include user interface elements created by a designer of the training application.

5. The method of claim 1, where generating the training application further includes:
generating a state machine in which each state of the state machine corresponds to a user interface configuration of the training application and in which transitions between states in the state machine include transitions based on events received from users.

6. The method of claim 5, where each state of the state machine is associated with one or more of the user interface elements and properties corresponding to the one or more of the user interface elements.

7. The method of claim 6, where, when performing a transition between states in the state machine, the state machine performs cross-field validation by validating the properties of all the user interface elements corresponding to the transitioned-to state.

8. A non-transitory computer-readable storage medium storing one or more instructions for execution by a processor, the computer-readable medium including:
instructions to receive a target application for which a training application is to be generated;
instructions to extract programmatic elements of the target application that present user interface configurations of the target application;
instructions to identify ones of the extracted programmatic elements that affect a user interface of the target application;
instructions to receive programmatic elements not extracted from the target application, and associated training parameters;
instructions to store the identified elements and the non-extracted elements as user interface elements;
instructions to generate, based on the associated training parameters, a set of training rules corresponding to the user interface elements, wherein the training rules differ from the associated properties; and
instructions to generate the training application using at least some of the user interface elements, via which the training rules are configured to present training interface configurations corresponding to the target application responsive to input received from a user interacting with the training application, wherein the training interface configurations differ from the user interface configurations.

9. The non-transitory computer-readable storage medium of claim 8, further including:
instructions to compare each of the programmatic elements of the target application to:
a list of standard programmatic elements that relate to the user interface elements, and
a list of custom programmatic elements that relate to the user interface elements.

10. The non-transitory computer-readable storage medium of claim 8, wherein receiving the target application includes receiving source code of the target application and wherein extracting the programmatic elements of the target application includes extracting the programmatic elements of the target application from the source code.

11. A device comprising:
a processor;
one or more memories; and
instructions for execution by the processor and configured to:
receive a target application for which a training application is to be generated,
receive a plurality of programmatic elements and associated properties of the target application,
store a plurality of user interface elements automatically extracted from the plurality of programmatic elements and the associated properties corresponding to user interface configurations of the target application,
store other user interface elements not extracted from the target application, and associated training parameters,
generate, based on the associated training parameters, a set of training rules that differ from the associated properties; and
present, based on the training rules, training interface configurations using the plurality of user interface elements and the other user interface elements, to a user of the training application that mimics the target application, wherein the training interface configurations differ from the user interface configurations.

12. The device of claim 11, where the user interface elements include programmatic classes, structures, or libraries in a software development environment.

13. The device of claim 11, wherein the processor is further configured to implement a state machine in which each state of the state machine corresponds to a state of the training interface configurations.

14. The device of claim 13, where transitions between states in the state machine include transitions based on events received from users of the training application.

15. The device of claim 13, where each state of the state machine is associated with one or more of the user interface elements and properties corresponding to the one or more of the user interface elements.

16. The device of claim 15, wherein, when performing a transition between states in the state machine, the state machine performs cross-field validation by validating the properties of all the user interface elements corresponding to the transitioned-to state.

17. A computing device-implemented method comprising:
receiving, by the computing device, a target application for which a training application is to be generated;
extracting, by the computing device, programmatic elements and associated properties corresponding to user interface configurations of the target application;
comparing, by the computing device, each of the extracted programmatic elements of the target application to a list of known programmatic elements that relate to generation of the user interface configurations;
storing, by the computing device, a list of the extracted programmatic elements of the target application that are determined, based on results of the comparison, to relate to the user interface configurations of the target application;
receiving, by the computing device, programmatic elements not extracted from the target application, and associated training data, wherein the associated training data differs from the associated properties;
generating, based on the associated training data, training interface configurations that mimic but differ from the user interface configurations; and
presenting, based on the associated training data, the training interface configurations using the plurality of user interface elements, to a user of the training application.

18. The method of claim 17, further comprising: using the stored list to construct the training application.

19. The method of claim 18, wherein the training application includes a state machine in which each state of the state machine corresponds to a state of the training interface configurations of the training application and in which transitions between states in the state machine include transitions based on events received from users.

20. The method of claim 19, wherein, when performing a transition between states in the state machine, the state machine performs cross-field validation by validating properties of the training interface configurations corresponding to the transitioned-to state.

21. The method of claim 17, where receiving the target application includes receiving source code of the target application.

22. The method of claim 17, where the extracted programmatic elements include programmatic classes, structures, or libraries in a software development environment.

* * * * *